No. 801,344. PATENTED OCT. 10, 1905.
L. STURGES.
COOLER FOR USE IN PASTEURIZING MILK OR OTHER FLUIDS.
APPLICATION FILED JUNE 24, 1904.
2 SHEETS—SHEET 1.
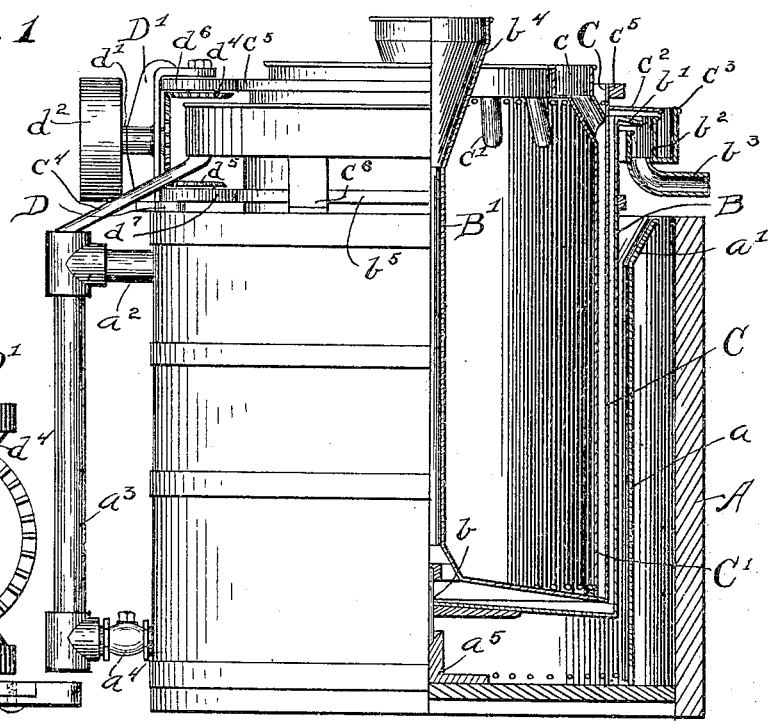
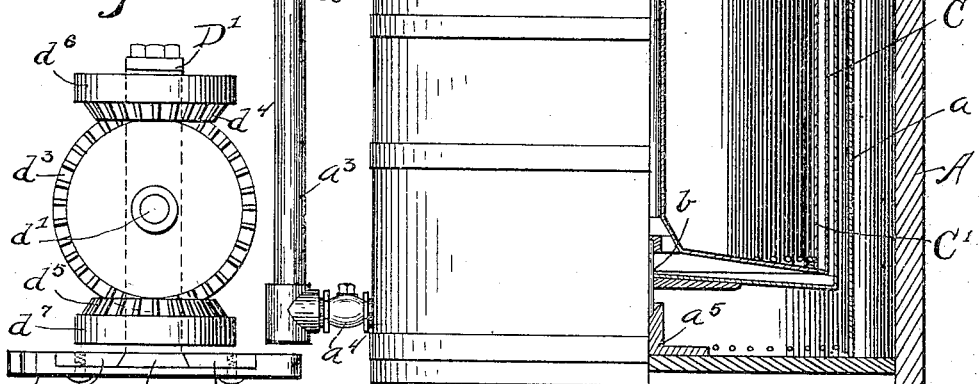
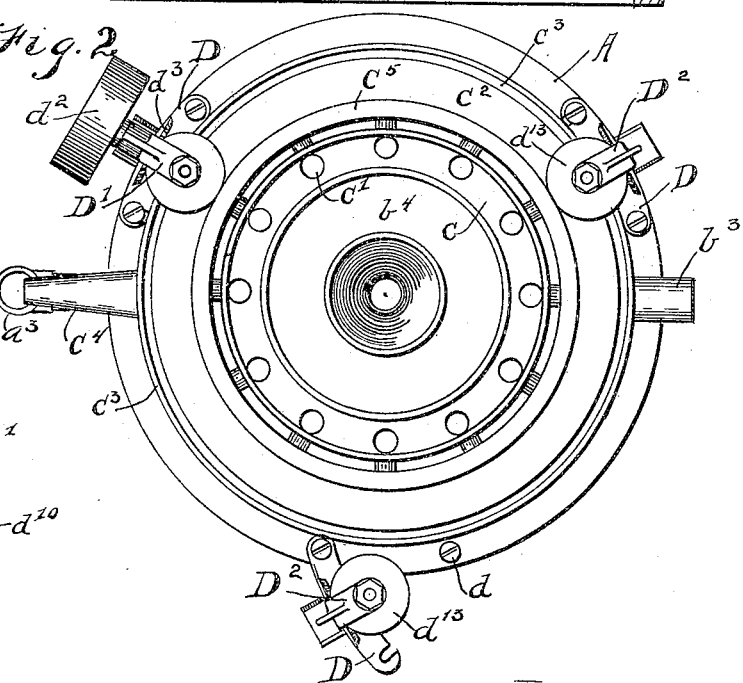
Witnesses
J. W. Angell.
W. W. Wittenbury
Inventor
Lee Sturges
by Charles M. Hill
Atty.

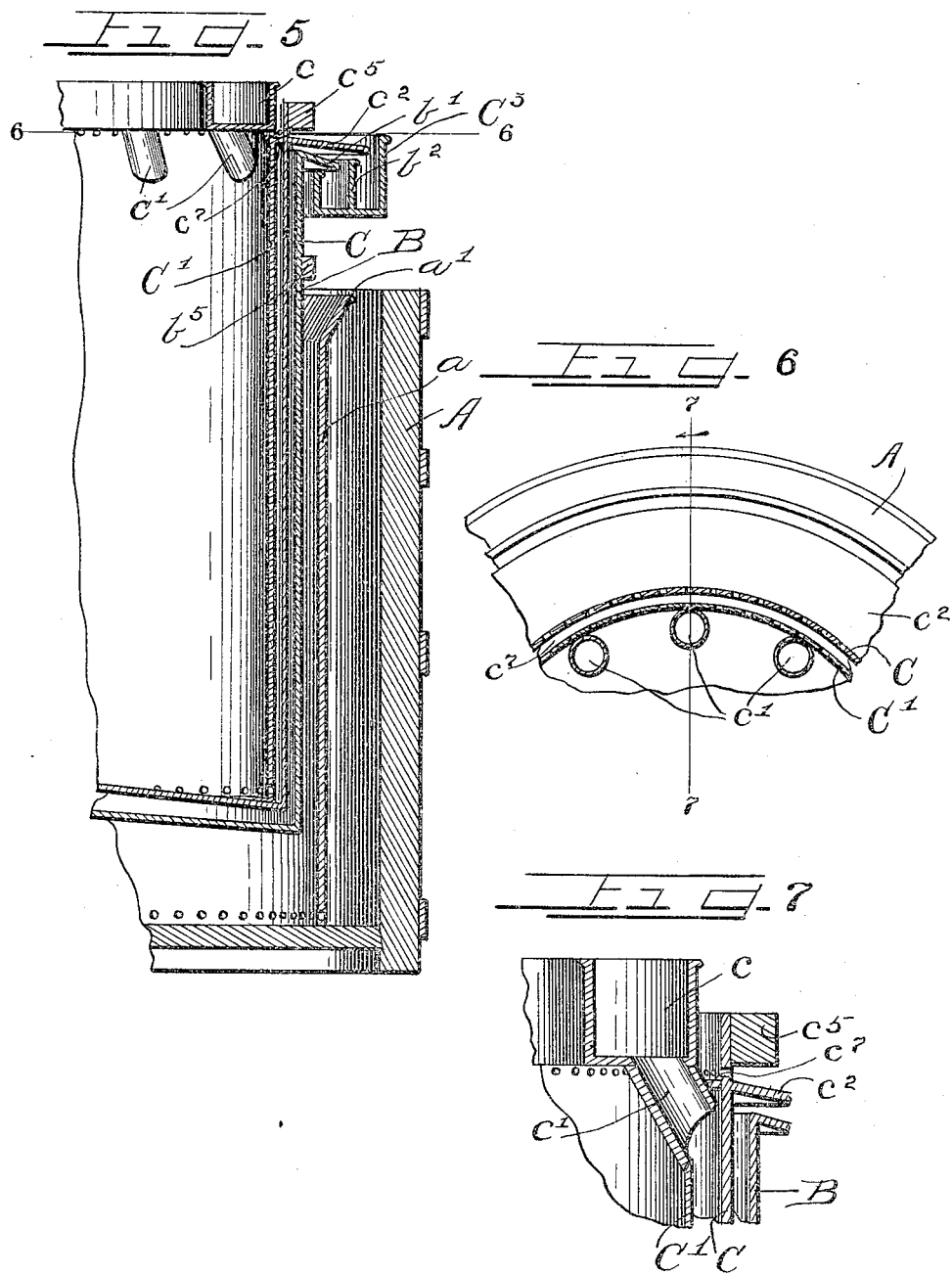

UNITED STATES PATENT OFFICE.

LEE STURGES, OF ELMHURST, ILLINOIS.

COOLER FOR USE IN PASTEURIZING MILK OR OTHER FLUIDS.

No. 801,344.          Specification of Letters Patent.          Patented Oct. 10, 1905.

Application filed June 24, 1904. Serial No. 213,920.

*To all whom it may concern:*

Be it known that I, LEE STURGES, a citizen of the United States, and a resident of Elmhurst, Dupage county, Illinois, have invented certain new and useful Improvements in Coolers for Use in Pasteurizing Milk or Other Fluids; and I do hereby declare that the following is a full, clear, and exact description of the same, reference being had to the accompanying drawings, and to the letters of reference marked thereon, which form a part of this specification.

This invention relates to coolers for pasteurizing, and more particularly to a cooler adapted to receive the milk from a heater of any desired kind and to cool the same after such heating.

Heretofore in devices of the kind while sometimes a plurality of cylinders have been used one within the other adapted one to contain the fluid to be cooled and one or more to contain a cooling fluid, such as water, such devices have required the use of the large quantities of water in the cooling cylinder or cylinders to sufficiently lower the temperature of the fluid treated. This has entailed expense and trouble, and owing to the fact that the hottest fluid rises to the surface in cooling the water used frequently becomes hot in the top of the apparatus. Thus it has been accomplished mostly in a comparatively small portion near the bottom of the containing cylinder.

The object of this invention is to provide a cooler in which the hot milk or other fluid to be cooled is confined within a comparatively narrow space adjacent the periphery of a revolving cylinder by a cooling-cylinder seated therein which revolves oppositely and which is so constructed as to provide a narrow annular compartment affording an internal water-jacket within which the cold water or other cooling liquid flows from the top downwardly or oppositely from the flow of the fluid to be cooled and in a like manner affording on the outer side of said containing cylinder an annular space or water-jacket in which the cooling fluid flows downwardly or oppositely from the flow of the fluid to be cooled.

It is also an object of the invention to provide simple and readily-adjusted means engaging said cylinders and acting to revolve the same oppositely.

The invention consists in the matters hereinafter described, and more fully pointed out and defined in the appended claims.

In the drawings, Figure 1 is a side elevation, partly in vertical section, of a cooler embodying my invention. Fig. 2 is a top plan view with parts removed and with one set of the friction or guide rollers turned back to illustrate the adjusting means therefor. Fig. 3 is an enlarged inner face view of the driving-gears for said cylinders. Fig. 4 is an enlarged fragmentary detail illustrating the foot of the bracket on which the driving-rollers are secured. Fig. 5 is an enlarged fragmentary longitudinal section illustrating details of construction. Fig. 6 is a section taken on line 6 6 of Fig. 5. Fig. 7 is an enlarged fragmentary longitudinal section taken on line 7 7 of Fig. 6.

As shown in said drawings, A indicates the usual tub, of wood or other suitable material, within which the cooling apparatus is contained. A cylindric shell $a$, of galvanized iron, copper, or other suitable material and perforated at its bottom, as shown in Fig. 1, and provided with an outwardly and upwardly inclined flange $a'$ at its top, extending approximately to the top of the tub, is secured in said tub, affording a narrow space between the same and the tub. An overflow-pipe $a^2$ is connected in the top of said tub A and is in open communication with a pipe $a^3$, adapted to convey the fluid therefrom to a convenient place of discharge, and a valved drainage-pipe $a^4$ is connected in the bottom of the tub and also in said discharge-pipe $a^3$. A bearing $a^5$ is rigidly secured in the bottom of said tub at the axis thereof and supported and journaled thereon by means of a pivot pin or rod $b$, which extends above, and below its bottom is the milk-containing cylinder B. Said cylinder B extends above the top of the tub and is provided at its upper end with an outwardly-extending flange $b'$, which extends downwardly into an annular trough $b^2$, which surrounds said cylinders and from the bottom of which extends a delivery-pipe $b^3$ for the treated and cooled milk or other fluids.

Rotatably secured within the milk-cylinder B and supported above the bottom thereof on the upper end of said pivot pin or rod $b$ is an inner revolving cylinder C. A supply-pipe B', extending axially therein, opens through the bottom and at its upper end extends above the top of said cylinder and is provided with a funnel-shaped top $b^4$, adapted to permit the ready delivery of the milk or other fluid thereinto. Secured within said inner cylinder and in close proximity with the walls thereof is an inner shell of galvanized iron or other suitable material C', upon the top of which and communicating in the annular space between the cylinder C and said inner shell C' is an annular trough $c$, which opens through pipes $c'$, connected in its bottom into said space between said cylinder and said casing. At the bottom and at the top of said inner casing C' apertures are provided to permit the cooling fluid to escape therethrough, and corresponding apertures are provided in the upper end of the cylinder C, from a point below which a flange $c^2$, soldered or otherwise permanently secured to the exterior of said cylinder by means affording a tight joint, extends outwardly and downwardly into a trough $c^3$, as shown, integral with the trough $b^2$ before described. The annular space between the cylinder C and the inner shell C' is closed at its upper end by an annular plate $c^7$, which is soldered or otherwise rigidly secured to said cylinder and shell at a point just below the apertures in the tops thereof and over which the cooling fluid passes during the escape from the cooler. Opening from said outermost trough $c^3$ is a delivery-pipe $c^4$, the end of which extends into the discharge-pipe $a^3$, as shown in Figs. 1 and 2. Means are provided for rotating said inner or cooling cylinder and the middle or milk cylinder oppositely, comprising, as shown, a foot-piece or base D, provided at one end with an aperture to receive a set-screw, whereby the same is secured to the top of the tub, and at the other end having a transverse inwardly-opening slot, as shown in Fig. 2, adapted to detachably engage a corresponding set-screw. Said base is provided with a central transverse seat, and a bracket D' is adjustably engaged therein by means of plates $d^{11}$, beveled at their inner edges and which are drawn against the oppositely-beveled and milled edges of the foot $d^{10}$ of said bracket and are secured in place by screws. A shaft $d'$ is journaled in said bracket and is provided on its outer end with a driving-pulley $d^2$ and on its inner end with a beveled gear $d^3$, which meshes with an upper beveled gear $d^4$ and a lower gear $d^5$, which each drive a friction-disk $d^6$ $d^7$, respectively, and which bear against the rims $b^5$ on the inner can or vessel C and the rim $c^5$ on the outer can B. Corresponding brackets $D^2$ are secured to the rim of the tub in like manner and are provided with rollers $d^{13}$, corresponding with the friction-disks $d^6$ and $d^7$.

The operation is as follows: The device constructed as described, the cylinders may be readily assembled in position by releasing the set-screws $d$ and turning the foot-pieces for the brackets outwardly, thus swinging the friction-rollers away from the top of the tub and affording space for the insertion of the respective cylinders. The annular troughs are first secured in place and are supported on the top of the tub by means of downwardly-extending brackets or legs $c^6$. The milk-cylinder B is then inserted through said annular troughs and is brought to its bearing upon the central support $a^5$ therefor in the bottom of the tub. Within this cylinder is next inserted the cylinder C, which is pivoted upon the upper end of the pivot bar or pin $b$, and the brackets are swung inwardly, the slotted end of each foot-piece engaging a set-screw $d$, which is then set up to rigidly secure the friction-pulleys in engagement with the rims $b^5$ $c^5$ on said cylinders. Water or any suitable cooling fluid is then delivered into the trough formed by the outwardly-directed flange $a'$ at the top of the cylinder or casing $a$, and the cold water therein delivered flows downwardly and fills the narrow annular space between the same and the milk-cylinder B and the space beneath said cylinder and passes through the apertures in the bottom of said shell or casing $a$ into the space between the same and the tub, after which it rises and escapes through the overflow-pipe $a^2$. Water or other cooling fluid is also poured into the annular trough $c$ at the top of the cylinder C and passes through the small pipes $c'$ into the narrow annular space between the outer wall of said cylinder C and the inner shell C' and flowing downwardly passes through the apertures at the bottom of said shell C', fills the cylinder, and surrounds the milk-supply pipe B' and a part of the funnel $b^4$. When the water reaches the level of the apertures at the top of said shell C', it flows outwardly over the plate $c^7$ and through the apertures at the top of the cylinder C and over the downwardly and outwardly inclined ledge or flange $c^2$ into the outer annular trough $c^3$ and thence escapes to the discharge-pipe $a^3$ through the delivery-pipe $c^4$. Inasmuch as the cold water is delivered into the top of each of said cylinders on each side of the annular space between the cylinders B and C, in which the milk or other treated fluid is contained, and flows downwardly while that within the shell C' flows upwardly, the direction of the flow is opposite from the flow of the heated milk or other treated fluid. This flows downwardly through the feed-pipe B', surrounded by the upwardly-flowing water that has passed through the apertures in the inner shell C', flows toward the periphery of the cylinder B, and rises upwardly through the annular space between the walls of the cylinders B and C and overflows at the desired temperature into the annular trough $b^2$ and the delivery-pipe $b^3$. Inasmuch as the cylinders B and C are of copper or other suitable metal of great thermal conductivity, the heat of the milk in its passage toward the point of delivery is constantly being absorbed by the progressively colder fluid in the water-jacket on each side of the same and separated therefrom by the thin conducting-walls between which the milk flows, so that the temperature at which the milk is delivered may be perfectly regulated by regulating the rapidity of flow of the water on each side of the same. A more rapid flow of water through the outer and inner cylinders will cool the treated fluid much more rapidly than a slower flow thereof.

Inasmuch as the fluids are contained in a relatively narrow space and in positive contact with the thin walls between the water and the treated milk and are constantly mildly agitated by the rotation of said cylinders in opposite directions, such agitation in itself serves to bring all the cooling fluid in contact with the cylinders and also serves to bring all of the heated fluid between said cylinders into contact with its cold retaining walls, thus enabling a much smaller quantity of the cooling fluid to be used than would otherwise be the case.

I have described but one of the several possible constructions embodying my invention, and I therefore do not desire to limit this application otherwise than as stated in the claims and necessitated by the prior art, as obviously many details of construction may be varied without departing from the principles of this invention.

I claim as my invention—

1. A cooler of the class described comprising oppositely-revolving cylinders one nested within the other between which the fluid to be cooled flows and means for admitting an oppositely-flowing cooling fluid in a thin stratum on each side the flow of the treated fluid and in contact with the walls of said cylinders.

2. A cooler of the class described comprising a revolving milk-cylinder of conducting material, a water-cylinder therein affording a narrow annular space between its walls and those of the milk-cylinder, a cylindric shell positioned within the water-cylinder and affording a narrow annular space between the same and the walls thereof, an outer cylinder arranged in close relation with the walls of the milk-cylinder and means directing a downward current of a cooling fluid on each side of the annular space for the milk, and means acting to revolve said milk and inner water cylinder oppositely.

3. In a cooler of the class described the combination with the tub of an annular shell therein and apertured at its bottom, annular troughs positioned above the tub, a milk-cylinder journaled in the tub and fitting loosely in said shell and at its upper end flanged to deliver its contents into one of the troughs, a water-cylinder journaled in the milk-cylinder, a milk-supply pipe extending axially therethrough, a cylindric shell permanently secured in the water-cylinder affording a narrow annular space between the walls thereof, a trough carried at the top of the water-cylinder and opening into said narrow annular space, apertures in the top of said water-cylinder, and the inner shell, an outwardly-directed flange adapted to direct the overflow into the other of said troughs and delivery and discharge pipes connected with said tub and the troughs and means revolving the water-cylinder and the milk-cylinder oppositely.

4. In a cooler the combination with a tub of a revolving milk-cylinder journaled therein, an inner metallic shell surrounding said cylinder and in close relation therewith and flanged outwardly at its top affording a receiving-trough and having apertures in the bottom thereof to permit the passage of the cooling fluid into the space between the same and the tub thereby affording a narrow annular space through which the cooling fluid flows downwardly in a thin stratum surrounding the milk-cylinder in which the hot milk flows upwardly.

5. In a cooler, a water-cylinder comprising a metallic cylinder of conducting material shaped to fit loosely within a milk-cylinder and affording a narrow annular space between the walls of said cylinders in which the fluid treated flows upwardly, an axial inlet-pipe extending through the water-cylinder, an inner casing in the water-cylinder in close proximity with the outer wall thereof and affording a thin annular compartment partly open at the bottom, a receiving-trough at the top of the water-cylinder opening into said annular space whereby the cooling fluid flows downwardly and then upwardly in the water-cylinder and oppositely from the flow of the milk through the cooler and means revolving said cylinders oppositely.

6. In a machine of the class described, the combination with an oppositely-revolving milk-cylinder and a water-cylinder of annular troughs surrounding the same, outwardly-directed flanges on said cylinders extending into the respective troughs and adapted to deliver thereinto the cooled milk and the water after cooling and means revolving said cylinders oppositely.

7. In a cooler, means for directing a thin current of the fluid to be cooled, between correspondingly thin strata and oppositely-flowing cooling fluids, said fluids being separated by thin revolving sheets of conducting material affording large areas and means affording mild agitation to the fluids.

8. In a cooler the combination with a milk-cylinder of a water-cylinder therein affording an annular space between the same, a shell in said water-cylinder, a plate closing the space between said shell and water-cylinder at the top thereof, a delivery-trough carried on said shell, pipes leading therefrom into said water-cylinder, a milk-supply pipe and means for revolving the milk and water cylinders oppositely.

9. In a cooler the combination with oppositely-revoluble cylinders affording an annular space therebetween for the passage of the fluid to be cooled of means for conducting a sheet of cooling fluid on each side of said space and oppositely from the fluid cooled.

10. In a cooler the combination with a tub of annular trough supported on the top thereof, means affording passages for non-connected currents of cooling fluid through said tub and means affording a passage for an oppositely-directed current of fluid to be cooled.

11. In a cooler the combination with a tub of an apertured cylinder therein affording an outer water-chamber and having an outwardly-flared upper end, a bearing in the bottom of said tub, a milk-cylinder journaled in said bearing and affording an annular space between the same and said cylinder, for the passage of water, a water-cylinder journaled in the milk-cylinder and providing an annular milk-space about the same, means adapted to rotate said water and milk cylinders oppositely, a discharge-pipe for the outer water-chamber and annular discharge-troughs carried on the tub for the water from the inner chamber and for the milk.

In testimony whereof I have hereunto subscribed my name in the presence of two subscribing witnesses.

LEE STURGES.

Witnesses:
C. W. HILLS,
HIALMAR S. RUDD.